United States Patent
Agardh et al.

(10) Patent No.: US 10,123,213 B2
(45) Date of Patent: Nov. 6, 2018

(54) METHODS AND DEVICES FOR SECURING RADIO RESOURCES FOR AN LTE-U DATA TRANSMISSION

(71) Applicants: Sony Corporation, Tokyo (JP); Sony Mobile Communications Inc., Tokyo (JP)

(72) Inventors: Kåre Agardh, Rydebäck (SE); Rickard Ljung, Helsingborg (SE); Yuichi Morioka, Reading (GB)

(73) Assignee: Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 15/600,120

(22) Filed: May 19, 2017

(65) Prior Publication Data

US 2017/0257776 A1 Sep. 7, 2017

Related U.S. Application Data

(63) Continuation of application No. 14/323,131, filed on Jul. 3, 2014, now Pat. No. 9,693,235.

(51) Int. Cl.
*H04W 16/14* (2009.01)
*H04W 74/08* (2009.01)

(52) U.S. Cl.
CPC ....... *H04W 16/14* (2013.01); *H04W 74/0816* (2013.01)

(58) Field of Classification Search
CPC .......................... H04W 16/14; H04W 74/0816
See application file for complete search history.

(56) References Cited

U.S. PATENT DOCUMENTS

2015/0223075 A1* 8/2015 Bashar .................. H04W 16/14
370/329

FOREIGN PATENT DOCUMENTS

| EP | 2 685 753 A1 | 1/2014 |
| WO | 2013174800 A1 | 11/2013 |
| WO | WO 2015/083914 A1 | 6/2015 |

OTHER PUBLICATIONS

Casaccia "Extending the benefits of LTE to unlicensed spectrum" 1-34 (2014).
European Patent Office Communication Pursuant to Article 94(3) EPC dated Jan. 2, 2018 corresponding to European Patent Application No. 15 700 178.5 (5 pages).
Peters "LTE-Unlicensed—The New Wifi?" *Global Media and Communications Watch* 1-4 (2014).
3GPP workshop on LTE in unlicensed spectrum, Sophia Antipolis, France, Jun. 13, 2014; RWS-140002; Sari Nielsen and Antti Toskala, Nokia Corporation, NSN, "LTE in Unlicensed Spectrum: European regulation and Co-existence Considerations", 13 pages.
International Search Report Corresponding to International Application No. PCT/EP2015/050007; dated May 18, 2015; 4 Pages.

(Continued)

*Primary Examiner* — Jae Y Lee
(74) *Attorney, Agent, or Firm* — Myers Bigel, P.A.

(57) ABSTRACT

A method for securing radio resources for a Long Term Evolution-unlicensed, LTE-U, data transmission is disclosed. The method includes transmitting a plurality of bits in an unlicensed frequency band which are inserted before the LTE-U data transmission. Related communication devices, methods by devices, and systems are disclosed.

19 Claims, 6 Drawing Sheets

(56) References Cited

OTHER PUBLICATIONS

Qualcomm Technologies, Inc., Qualcomm Research LTE in Unlicensed Spectrum: Harmonious Coexistence with Wi-Fi, Jun. 2014, 19 Pages.
3GPP workshop on LTE unlicensed spectrum, Sophia Antipolis, France, Jun. 13, 2014, Views on LAA for Unlicensed Spectrum—Scenarios and Initial Evaluation Results, NTT Docomo, Inc., 12 Pages.
3GPP workshop on LTE in unlicensed spectrum, Sophia Antipolis, France, Jun. 13, 2014; RWS-140003; Marc Grant, AT&T, Adhoc on LTE in Unlicensed Spectrum, "Assisted Access for LTE", 11 pages.
3GPP workshop on LTE in unlicensed spectrum, Sophia Antipolis, France, Jun. 13, 2014; RAN64, Sophia Antipolis, France, Jun. 13, 2014; CableLabs, Rogers, Benu Networks, Ruckus Wireless; RWS-140004, "CableLabs Perspectives on LTE-U Coexistence with Wi-Fi and Operational Modes for LTE-U", 15 pages.
3GPP workshop on LTE in unlicensed spectrum, Sophia Antipolis, France, Jun. 15, 2014; HiSilicon, RWS-140005, "Scenarios, spectrum considerations and preliminary assessment results of U-LTE", 21 pages.
3GPP workshop on LTE in unlicensed spectrum, Sophia Antipolis, France, Jun. 13, 2014; InterDigital, RWS-140006, "A Look At the Requirements for LTE in the Unlicensed Bands", 17 pages.
3GPP workshop on LTE in unlicensed spectrum, Sophia Antipolis, France, Jun. 13, 2014; T-Mobile USA, RWS-140007, "View on LTE Carrier Aggregation with Unlicensed Spectrum", 8 pages.
3GPP workshop on LTE in unlicensed spectrum, Sophia Antipolis, France, Jun. 13, 2014; Qualcomm, Lorenzo Casaccia, "Extending the benefits of LTE to unlicensed spectrum", 20 pages.
3GPP workshop on LTE in unlicensed spectrum, Sophia Antipolis, France, Jun. 10-13, 2014; 3GPP TSG-RAN #64, RWS-140009, China Unicorn, "Consideration of Unlicensed LTE Spectrum in China", 8 pages.
3GPP workshop on LTE in unlicensed spectrum, Sophia Antipolis, France, Jun. 13, 2014; Sony Mobile Communications, RWS-140010, "Requirements and Coexistence Topics for LTE-U", 11 pages.
3GPP workshop on LTE in unlicensed spectrum, Sophia Antipolis, France, Jun. 13, 2014; TeliaSonera, RWS-140011, "An operator view on LTE in unlicensed spectrum", 7 pages.
Communication pursuant to Article 94(3) EPC corresponding to European Patent Application No. 15700178.5 dated Jul. 23, 2018. (5 pages).

\* cited by examiner

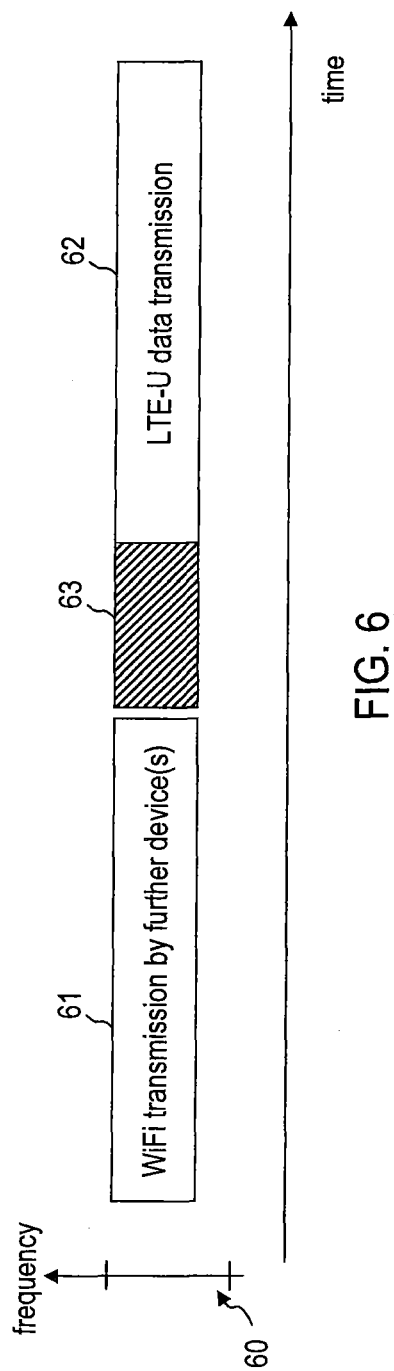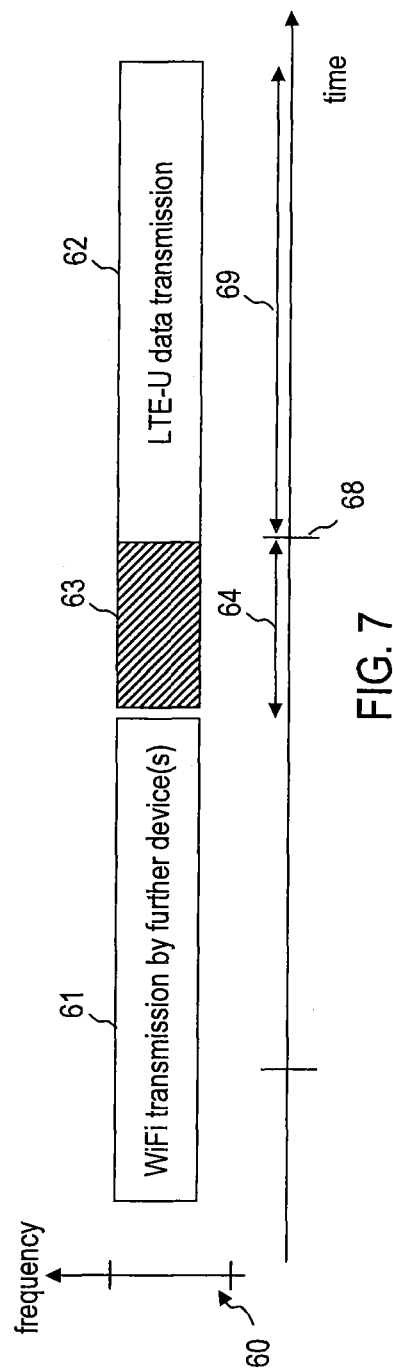

METHODS AND DEVICES FOR SECURING RADIO RESOURCES FOR AN LTE-U DATA TRANSMISSION

CROSS REFERENCE TO RELATED APPLICATION

The present application is a continuation of U.S. patent application Ser. No. 14/323,131, filed Jul. 3, 2014, the disclosure of which is hereby incorporated herein by reference in its entirety.

FIELD OF THE INVENTION

Embodiments of the invention relate to wireless communication. Embodiments of the invention relate in particular to communication in long term evolution (LTE)-unlicensed (LTE-U) frequency bands.

BACKGROUND OF THE INVENTION

With increasing popularity of mobile voice and data communication, there is an ever increasing demand for high-speed voice and data communication. The licensed spectrum for cellular communication is rapidly being exhausted by a dense and growing subscriber base. This applies in particular to the valuable low-frequency bands with low propagation loss traits.

A significant amount of unlicensed spectrum is available. For illustration, a significant amount of spectrum is globally available in the 5 GHz band. It is desirable to utilize the LTE-unlicensed (LTE-U) spectrum to augment the capacity of licensed frequency carriers. The LTE-U spectrum may be used for carrying data traffic for mobile services. The purpose of LTE-U is to extend LTE cellular communication to unlicensed spectrum.

Because the spectrum in the unlicensed band may also be used by communication techniques different from cellular communication, a communication device, e.g. an eNodeB, will not always be able to transmit when it intends to transmit LTE-U data. The reason for this is that radio resources in the LTE-U spectrum may be used by Wi-Fi or other non-cellular communication techniques.

BRIEF SUMMARY OF THE INVENTION

There is a continued need in the art for devices, systems and methods which mitigate at least some of the above shortcomings. There is in particular a need for devices, systems and methods in which a probability that resource usage by other devices prevents a communication device from transmitting in the LTE-U spectrum may be mitigated.

According to embodiments, a communication device which is configured for an LTE-U data transmission in the LTE-U spectral range may include plurality of bits for transmission in a radio resource before the actual LTE-U data transmission. The risk that other devices start using the radio resource in a time gap remaining until the LTE-U data transmission starts may thereby be mitigated.

The communication device may include information in the plurality of bits. The information included in the plurality of bits may be used to increase a detection probability for the LTE-U data transmission. Alternatively or additionally, the information included in the plurality of bits may be used to inform at least one further communication device of an intended duration of the upcoming LTE-U transmission. Alternatively or additionally, the information included in the plurality of bits may be used by at least one further communication device to estimate channel properties or to otherwise improve LTE-U demodulation.

In a method of securing radio resources for an LTE-unlicensed, LTE-U, data transmission of a communication device in an unlicensed frequency band, the communication device transmits a plurality of bits in the unlicensed frequency band which are inserted before the LTE-U data transmission.

The communication device may generate the plurality of bits in response to detecting that the communication device intends to perform the LTE-U data transmission.

A number of bits of the plurality of bits may be set by the communication device in dependence on a time gap to a start time of an LTE subframe. The communication device may thereby block the resource for usage by other devices until the LTE-U data transmission is started in a manner synchronized with a timing of a cellular network.

The communication device may synchronize the LTE-U data transmission with the start time of the LTE subframe.

The communication device may monitor whether at least one further communication device uses the radio resource in the unlicensed frequency band. The communication device may start transmitting the plurality of bits while the radio resources are not used by the at least one further communication device.

The plurality of bits may prevent at least one further communication device from using the radio resources until the LTE-U data transmission starts.

The at least one further communication device may comprise at least one Wi-Fi transmitter which is prevented from using the radio resources until the LTE-U data transmission starts.

A further communication device may receive the plurality of bits. The further communication device may use the plurality of bits for demodulating the LTE-U data transmission.

The further communication device may estimate channel properties of the LTE-U data transmission using the plurality of bits.

The further communication device may be a user equipment of a cellular network.

The plurality of bits may comprise a resource allocation for the LTE-U data transmission.

The plurality of bits may comprise a WLAN preamble, e.g. a Wi-Fi preamble.

The plurality of bits may comprise a WLAN preamble, e.g. a Wi-Fi preamble and a PHY header.

The plurality of bits may comprise LTE pilot data.

The LTE data transmission may comprise LTE control data transmitted in the unlicensed band.

The LTE data transmission may comprise LTE payload data transmitted in the unlicensed band. The LTE payload data may be mobile service data.

The communication device may be an evolved NodeB (eNodeB).

A communication device according to an embodiment comprises a transmitter configured to transmit LTE-unlicensed, LTE-U, radio signals in an unlicensed frequency band. The communication device is configured to secure radio resources in the unlicensed frequency band for an LTE-U data transmission by transmitting a plurality of bits in the unlicensed frequency band which are inserted before the LTE-U data transmission.

The communication device may be configured to generate the plurality of bits in response to detecting that the LTE-U data transmission must be performed.

The communication device may be configured to set a number of bits of the plurality of bits in dependence on a time gap to a start time of an LTE subframe.

The communication device may be configured to synchronize the LTE-U data transmission with the start time of the LTE subframe.

The communication device may be configured to monitor whether at least one further communication device uses the radio resource in the unlicensed frequency band. The communication device may be configured to start transmitting the plurality of bits while the radio resources are not used by the at least one further communication device.

The communication device may be configured to generate the plurality of bits to thereby prevent at least one further communication device from using the radio resources until the LTE-U data transmission starts. The at least one further communication device may comprise at least one Wi-Fi transmitter which is prevented from using the radio resources until the LTE-U data transmission starts.

The communication device may be configured to generate the plurality of bits such that the plurality of bits comprises a resource allocation for the LTE-U data transmission.

The communication device may be configured to generate the plurality of bits such that the plurality of bits comprises a WLAN preamble, e.g. a Wi-Fi preamble.

The communication device may be configured to generate the plurality of bits such that the plurality of bits comprises a WLAN preamble, e.g. a Wi-Fi preamble and a PHY header. The communication device may be configured to indicate a time of the LTE-U data transmission in the PHY header.

The communication device may be configured to generate the plurality of bits such that the plurality of bits comprises LTE pilot data.

The communication device may be configured to generate the LTE data transmission such that the LTE data transmission comprises LTE control data transmitted in the unlicensed band.

The communication device may be configured to generate the LTE data transmission such that the LTE data transmission comprises LTE payload data transmitted in the unlicensed band. The LTE payload data may be mobile service data.

The communication device may be an evolved NodeB (eNodeB).

The communication device may be configured to perform the method according to an embodiment.

A communication system comprises a communication device according to an embodiment and at least one further communication device.

The communication device may be an eNodeB. The communication device may be an eNodeB serving a micro or pico cell.

The further communication device may be a user equipment of a cellular network. The further user equipment may use the plurality of bits transmitted by the communication device for demodulating the LTE-U data transmission. The further user equipment may use the plurality of bits transmitted by the communication device for determining a time and/or duration of the LTE-U data transmission.

In the methods, devices, and systems according to embodiments, the unlicensed frequency band may be a portion of a radio spectrum which is not licensed to any operator of a cellular communication network.

In the methods, devices, and systems according to embodiments, the unlicensed frequency band may be the 5 GHz band or may comprise at least one subband of the 5 GHz band. In the methods, devices, and systems according to embodiments, the unlicensed frequency band may be the 5 GHz band or may comprise at least one subband of the 3.5 GHz band.

Devices, systems and methods according to embodiments allow a communication device to mitigate the risk that other devices block LTE-U radio resources just before the communication device transmits the LTE-U data transmission in the unlicensed frequency band. By adding information in the plurality of bits, a header may be formed for the LTE-U data transmission which may be used by further communication devices for demodulating the LTE-U data transmission and/or for estimating channel properties.

BRIEF DESCRIPTION OF THE DRAWINGS

Embodiments of the invention will be described with reference to the accompanying drawings in which the same or similar reference numerals designate the same or similar elements.

FIG. 6 is a view illustrating a transmission of a plurality of bits inserted before a LTE-U data transmission by a communication device according to an embodiment.

FIG. 7 is a view illustrating a transmission of a plurality of bits inserted before a LTE-U data transmission by a communication device according to an embodiment.

DETAILED DESCRIPTION

Exemplary embodiments of the invention will be described with reference to the drawings. While some embodiments will be described in the context of specific fields of application, e.g. in the context of certain spectral ranges and communication techniques, the embodiments are not limited to this field of application. The features of the various embodiments may be combined with each other unless specifically stated otherwise.

Figure 1:
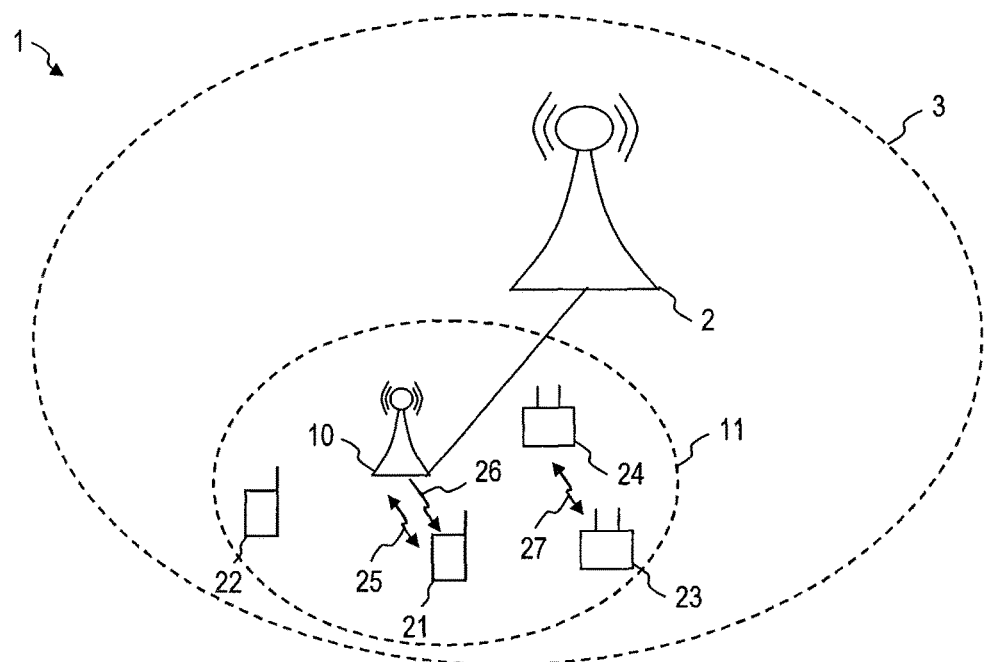
FIG. 1 is a schematic view of a communication system according to an embodiment.

FIG. 1 is a schematic view of a communication system 1 according to an embodiment. The communication system 1 illustrates one of various possible exemplary scenarios in which transmissions in Long Term Evolution (LTE)-unlicensed (LTE-U) frequency bands may be employed. A cellular communication network has a radio access network having a base station 2. The base station 2 may serve a macro cell 3. There may be one or several smaller operator deployed cell(s) 11. The cell 11 may be a micro cell or a pico cell. An eNodeB 10 may be deployed by an operator of the cellular communication network for serving the cell 11. The cell 11 of the cellular communication network may support a transmission of the LTE traffic data both in LTE licensed frequency bands and in LTE-U frequency bands.

The unlicensed frequency band(s) which may be used for LTE-U data transmissions may be frequency bands which are not exclusively licensed to a cellular network operator. The unlicensed frequency band(s) which may be used for LTE-U data transmissions may be frequency bands which are not licensed to any cellular network operator.

The unlicensed frequency band(s) may include one or several frequency bands for which a cellular network operator has primary rights, but for which spectrum may be utilized by secondary other users, e.g. if not used on each geographic location.

The unlicensed frequency band(s) may include shared spectrum for which one operator has primary rights, but which may be co-utilized by secondary users at least under certain conditions.

The LTE-U frequency bands may include at least some subbands of the 5 GHz band, for example. The LTE-U frequency bands may include a frequency band from 5150 MHz to 5350 MHz, which is a subband of the 5 GHz band. Alternatively or additionally, the LTE-U frequency bands may include a frequency band from 5150 MHz to 5250 MHz, which is another subband of the 5 GHz band. Alternatively or additionally, the LTE-U frequency bands may include a frequency band from 5250 MHz to 5350 MHz, which is another subband of the 5 GHz band. Alternatively or additionally, the LTE-U frequency bands may include a frequency band from 5470 MHz to 5725 MHz, which is another subband of the 5 GHz band. Alternatively or additionally, the LTE-U frequency bands may include the 3.5 GHz band. The LTE-U frequency bands may include the U U-NII-3 5 GHz unlicensed band.

Any one of various deployment options may be used for aggregating unlicensed spectrum to a licensed carrier to augment capacity. In a Supplemental Downlink (SDL) mode of operation, the unlicensed spectrum may be utilized only for the downlink to augment capacity and increase data rates in a heavily trafficked downlink. In a Carrier Aggregation (CA) mode of operation allows use of unlicensed spectrum in both the downlink and uplink. The CA mode allows the amount of unlicensed spectrum resource that can be allocated for uplink or downlink to be adjusted.

FIG. 1 exemplarily illustrates a SDL mode of operation. Downlink (DL) and uplink (UL) control signalling and data traffic may be transmitted in the LTE-licensed carrier frequencies by radio signals 25. At least DL traffic may be transmitted from the eNodeB to a further communication device 21, which may be a user equipment of the cellular network, in a LTE-U radio signal 26. The LTE-U radio signal may have a frequency in the LTE-U frequency bands.

Offloading data traffic to the LTE-U frequency bands may be performed selectively for only some of the user equipments in the cell 11. For illustration, the eNodeB 10 may perform LTE-U data transmissions for DL traffic to the user equipment 21, but may not perform LTE-U offloading for another user equipment 22.

While FIG. 1 exemplarily shows a scenario in which the eNodeB acts as a communication device which performs LTE-U data transmissions using radio resources in an LTE-U frequency band, the techniques according to embodiments can also be used when the user equipment 21 acts as a communication device which perform LTE-U data transmissions using radio resources in an LTE-U frequency band. The LTE-U data transmissions may be DL or UL transmissions.

The LTE-U frequency bands may also be used by one or several devices 23, 24 which are not under a control of a cellular network operator. Examples for such devices 23, 24 include WLAN devices, which may communicate using Wi-Fi or Bluetooth, for example, or WLAN access points. The presence of such device 23, 24 which are configured to transmit in a LTE-U frequency band which is intended to be used for LTE-U data transmissions may lead to interference problems. For illustration, the eNodeB will not be able to transmit a LTE-U data transmission in a radio resource which is used by one or several of the devices 23, 24 at the respective time. Transmissions 27 between the devices 23, 24 may have a frequency in the LTE-U frequency bands and are prone to causing interference with a LTE-U data transmission.

As will be explained in more detail below, a communication device according to an embodiment may mitigate the risk that a LTE-U data transmission cannot be performed because of conflicting transmissions by further communication devices, such as the non-cellular communication devices 23, 24. To this end, the communication device may generate a plurality of bits which are inserted for transmission before the actual LTE-U data transmission. The communication device may set a number of bits in the plurality of bits such that a radio resource in the LTE-U frequency band is used for transmitting the number of bits until the LTE-U data transmission starts. The LTE-U data transmission may be started in synchronization with a start time of a subframe of the cellular communication network, for example.

The communication device which generates and inserts the plurality of bits as pre-transmission bits may generate the plurality of bits such that the plurality of bits includes information. The information may be processed by a further communication device, e.g. the user equipment 21, or by non-cellular communication devices 23, 24. The information may be LTE pilot data. The user equipment 21 may process the LTE pilot data and may use the LTE pilot data for demodulating the subsequent LTE-U transmission. The information may define a time at which the LTE-U transmission is started and/or a duration of the LTE-U transmission.

As will be explained in more detail below, the communication device according to an embodiment may generate the plurality of bits such that they form a header for the LTE-U data transmission. The header may include one or several of a WLAN preamble, a Wi-Fi preamble, a PHY header, and/or LTE pilot data.

A scenario has been explained with reference to FIG. 1 in which unlicensed and licensed carriers may be co-located and carrier aggregation may be performed, with the LTE-U acting as secondary carrier. The techniques described in more detail with reference to FIG. 2 to FIG. 12 below may also be used for standalone scenarios in which the LTE-U transmissions do not necessarily need to be accompanied by a LTE licensed carrier as primary carrier.

Figure 2:
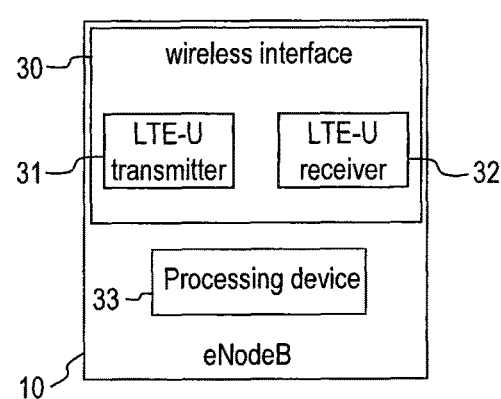
FIG. 2 is a schematic view of a communication device according to an embodiment.

FIG. 2 is a diagram of a communication device 10 according to an embodiment. The communication device 10 is configured as an eNodeB. However, a configuration as explained with reference to FIG. 2 may be implemented in any LTE-U transmitting device. For illustration, a user equipment of the cellular communication network may be operative as explained in more detail with reference to FIG. 2 to FIG. 12 below and the LTE-U data transmission may be an UL transmission.

The communication device 10 comprises a wireless interface 30. The wireless interface 30 may be configured to transmit and receive data over an eUTRA air interface. The wireless interface 30 comprises a LTE-U transmitter 31. The LTE-U transmitter 31 is configured to transmit LTE data. The LTE-U transmitter 31 may be configured to transmit traffic data in accordance with a Physical Downlink Shared Channel (PDSCH). The LTE-U transmitter 31 may be configured to use radio resources from a LTE-U frequency band which are not licensed to any cellular network operator for transmitting the traffic data. The LTE-U transmitter 31 may optionally be configured to transmit control data in accordance with a Physical Downlink Control Channel (PDCCH). The LTE-U transmitter 31 may be configured to use radio resources from a LTE-U frequency band which are not licensed to any cellular network operator for transmitting the control data. The LTE-U transmitter 31 may be configured to perform a modulation to generate LTE-U radio signals having a frequency in a frequency band which is not licensed to any cellular network operator.

The wireless interface 30 may optionally comprise a LTE-U receiver 32. The LTE-U receiver 32 may be configured to perform LTE-U demodulation. The LTE-U receiver 32 may be configured to demodulate radio signals having a frequency in a frequency band which is not licensed to any cellular network operator.

The communication device 10 may have a processing device 33. The processing device 33 may be configured to monitor, via the LTE-U receiver 32, whether other communication devices use radio resources in the LTE-U spectrum. The processing device 33 may be configured to generate a plurality of bits and to provide the plurality of bits to the LTE-U transmitter 31 for transmission before the LTE-U data transmission. The processing device 33 may be configured to generate the plurality of bits such that energy is output at the radio resource which is to be used for the forthcoming LTE-U data transmission. This energy at the radio resource in the LTE-U spectrum may prevent other cellular or non-cellular communication devices from starting a transmission at the respective radio resource just before the communication device 10 starts transmitting the LTE-U.

The processing device 33 may be configured such that the plurality of bits provided to the LTE-U transmitter 31 for transmission carry information. The information may be LTE pilot data or may comprise LTE pilot data. In addition to reducing the risk that other cellular or non-cellular communication devices will block a radio resource for the LTE-U data transmission, the transmission of the plurality of bits then allows a LTE-U receiving device, e.g. the user equipment 21, to improve LTE-U demodulation based on the LTE pilot signal.

Alternatively or additionally, the information included in the plurality of bits by the processing device 33 may be a WLAN preamble, e.g. a Wi-Fi preamble, and a PHY header. The Wi-Fi preamble and PHY header may be configured as defined in IEEE 802.11. The PHY header may comprise a length field. The processing device 33 may add timing information in the length field of the PHY header which may indicate a time at which a LTE-U data transmission starts and/or a duration of the LTE-U data transmission.

Alternatively or additionally, the information included in the plurality of bits by the processing device 33 may be a WLAN preamble, e.g. a Wi-Fi preamble. The detection probability of the plurality of bits by a WLAN device 23, 24 may thereby be increased.

The processing device 33 may be configured to dynamically adjust the amount of information in the plurality of bits depending on a time remaining to a start time of the next subframe of the cellular network. When the processing device 33 detects that usage of a radio resource by further communication devices ends, it may determine the time remaining until the next subframe starts. The amount of information, e.g. the number of bits of the at least one bit, may be set depending on the time which remains until the next subframe starts. The amount of information, e.g. the number of bits of the at least one bit, may be set such that the plurality of bits is transmitted until the start of the next subframe, and that the LTE-U data transmission may start at the beginning of the next subframe. This allows the LTE-U data transmissions to be synchronized to the subframes of the cellular communication network. This may be desirable for synchronized secondary cells.

Various effects are attained by transmitting the plurality of bits and, optionally, adding information to the plurality of bits. Other devices, e.g. the non-cellular devices 23, 24, are less likely to start using a radio resource when the communication device 10 outputs energy at this radio resource to block it until the LTE-U data transmission is started. The LTE-U receiver of a further user equipment may more easily detect the start of the LTE-U transmission. For illustration, the LTE-U receiver of a user equipment 21 may detect the LTE pilot data transmitted in the plurality of bits, which may aid the user equipment in detecting the start of the actual LTE-U data transmission.

The techniques according to embodiments may not only be used for standalone LTE-U, but also when unlicensed and licensed carriers are integrated. Carrier aggregation mechanisms of LTE Rel-10 to Rel-12 may serve the purpose of aggregating LTE-U carriers and licensed LTE carriers. The LTE-U carrier may be integrated as secondary carrier into a LTE licensed network, as illustrated in FIG. 3 and FIG. 4.

Figure 3:
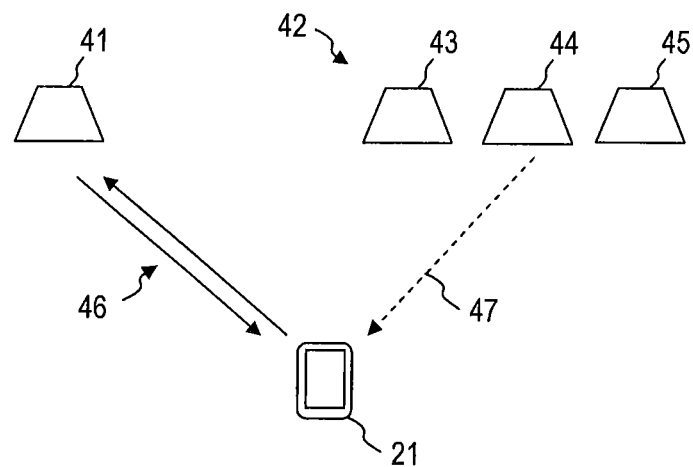
FIG. 3 shows a utilization of an LTE-U frequency band in a method and system according to an embodiment.

FIG. 3 illustrates a scenario in which a communication device may use a carrier 41 licensed to the cellular network operator and radio resources in a LTE-U frequency band 42. The LTE-U frequency band 42 may include several carriers 43-45.

The licensed carrier 41 may be used for DL and UL control signalling and data transmissions 46. The radio resource for the LTE-U data transmission, e.g. a carrier in the LTE-U frequency band 42, may be used at least for DL LTE data traffic. DL data traffic may be offloaded to the secondary carrier when needed.

Figure 4:
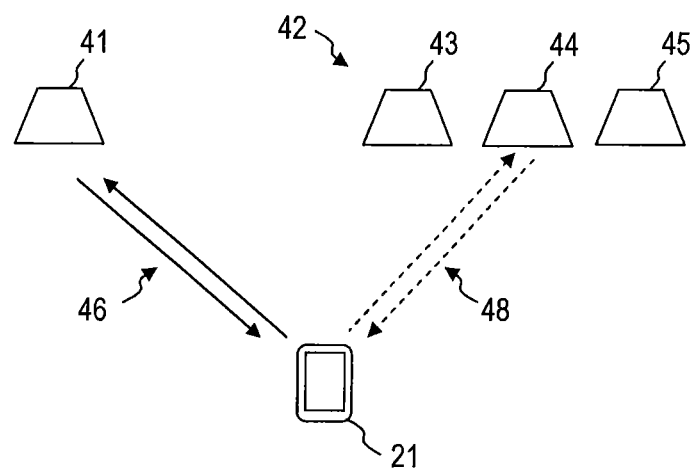
FIG. 4 shows a utilization of an LTE-U frequency band in a method and system according to an embodiment.

FIG. 4 illustrates a scenario in which the radio resource for the LTE-U data transmission, e.g. a carrier in the LTE-U frequency band 42, may be used at least for UL and DL LTE data traffic. UL and DL data traffic may be offloaded to the secondary carrier when needed. The LTE-U spectrum may be operated in time division duplex (TDD).

In yet further implementations, it is not required that the LTE-U be combined with a primary carrier in the licensed LTE frequencies.

In any one of the various implementations, the communication device according to an embodiment may mitigate the risk of interference for LTE-U data transmissions by inserting a plurality of bits just before the LTE-U data transmission, as will be explained in more detail with reference to FIG. 5 to FIG. 12.

Figure 5:
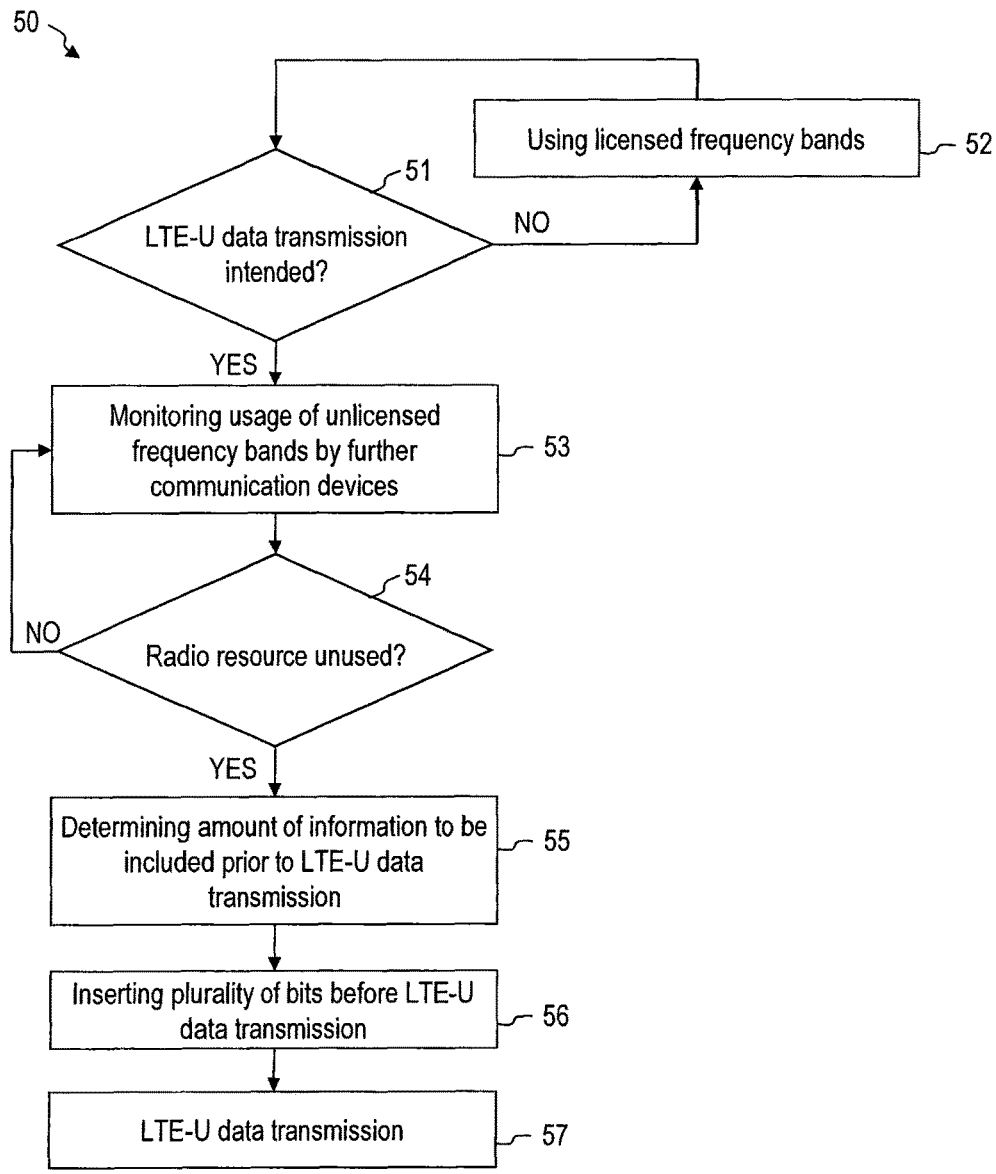
FIG. 5 is a flow chart of a method according to an embodiment.

FIG. 5 is a flow chart of a method 50 according to an embodiment. The method 50 may be performed by the communication device according to an embodiment. The method 50 may be performed by an eNodeB according to an embodiment.

At 51, the communication device determines whether a LTE-U data transmission is intended to be performed. A decision on whether LTE-U data transmissions are to be performed may depend on a traffic load in the downlink, for example. Offloading to LTE-U may be selectively activated only when the traffic load in the downlink exceeds a threshold.

At 52, if it is not intended to perform LTE-U data transmissions, the carriers licensed to a cellular network operator may be used. The method may return to 51.

At 53, if it is intended to perform a LTE-U data transmission, the usage of one or several carriers of the LTE-U frequency band(s) may be monitored. An LTE-U receiver may detect radio energy on respectively each one of several carriers to determine which one(s) of the several carriers are being used by other devices.

At 54, it is determined whether an unused radio resource has been detected. If no unused radio resource has been detected, the method may return to 53 until a radio resource in the LTE-U frequency band(s) becomes free.

At 55, an amount of information which is to be included prior to the LTE-U data transmission may be determined. Determining the amount of information may be performed in dependence on a time gap which remains until the next subframe starts. The amount of information and/or a number of a plurality of bits which are inserted before the LTE-U data transmission may be set such that the plurality of bits can all be transmitted before the start of the next subframe. The amount of information and/or a number of a plurality of bits which are inserted before the LTE-U data transmission may be set such that the transmission of the plurality of bits continues until the LTE-U data transmission starts at the start of the next subframe.

At 55, the plurality of bits is inserted before the LTE-U data transmission. The plurality of bits and the LTE-U data transmission may be combined in one LTE-U packet.

At 56, the LTE-U data transmission is performed.

The method may then return to 51.

FIG. 6 is a view illustrating operation of a communication device according to an embodiment when a radio resource 60, e.g. a LTE-U carrier in a LTE-U frequency band, is to be used for the LTE-U data transmission 62.

The communication device may detect that the radio resource 60 is used by one or several further device(s). For illustration, a WLAN device or other non-cellular device may use the radio resource 60 for transmitting a Wi-Fi frame 61. The communication device may monitor the energy at the frequency of the radio resource 60 to determine whether the radio resource 60 is used by one or several further device(s).

When the communication device detects that the transmission of the Wi-Fi frame 61 terminates, it may output energy in the radio resource 60 to prevent the further communication device(s) from starting a new transmission just before the LTE-U data transmission 62 starts. The communication device outputs a plurality of bits 63 which are inserted just before the LTE-U data transmission. The plurality of bits 63 may all have a pre-defined value or may have random values if it is only intended to output energy at the radio resource 60 to mitigate the risk of interference. The plurality of bits 63 may also carry information, e.g. LTE pilot data or information on a duration of the LTE-U data transmission 62 or information on the time gap remaining to the start of the LTE-U data transmission 62.

FIG. 7 is a view illustrating operation of a communication device according to an embodiment when a radio resource 60, e.g. a LTE-U carrier in a LTE-U frequency band, is to be used for the LTE-U data transmission 62.

The LTE-U data transmission 62 is synchronized to a start 68 of subframe 69. To mitigate the risk that a further communication device prevents the communication device from starting the LTE-U data transmission 62, the plurality of bits 63 may include a number of bits which is set such that the transmission of the plurality of bits 63 terminates just at the start 68 of the subframe 69. The plurality of bits 63 may thereby serves as a header or information block which directly precedes the LTE-U data transmission.

The plurality of bits 63 may have any one of a variety of formats and may include any one of a variety of different information elements. Implementations according to some embodiments are explained in more detail with reference to FIG. 8 to FIG. 10.

Figure 8:
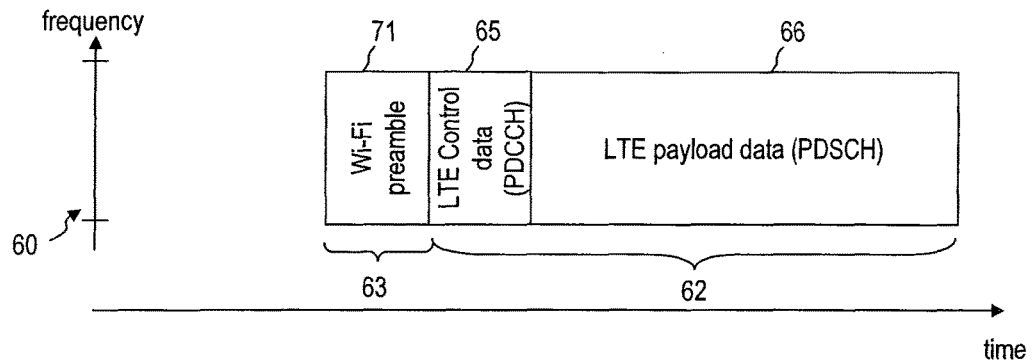
FIG. 8 is a view illustrating a transmission of a plurality of bits inserted before a LTE-U data transmission by a communication device according to an embodiment.

FIG. 8 is a view illustrating operation of a communication device according to an embodiment when a radio resource 60, e.g. a LTE-U carrier in a LTE-U frequency band, is to be used for the LTE-U data transmission 62. The LTE-U data transmission 62 may include payload data 66. The LTE-U data transmission 62 may include control data 65. While the payload data 66 and the control data 65 may be configured in accordance with LTE, the data is transmitted at frequencies not licensed to a cellular network operator.

The plurality of bits 63 includes a WLAN preamble, e.g. a Wi-Fi preamble 71 or may consist of the WLAN preamble, e.g. the Wi-Fi preamble 71. The WLAN preamble may be a Wi-Fi preamble according to the IEEE 802.11 standard family.

Wi-Fi devices have a higher sensitivity requirement for detecting the Wi-Fi preamble. By transmitting the Wi-Fi preamble, the detection probability by Wi-Fi devices is increased, thereby further reducing the risk that a Wi-Fi device will block the radio resource when the communication device is about to start the LTE-U data transmission 62.

Figure 9:
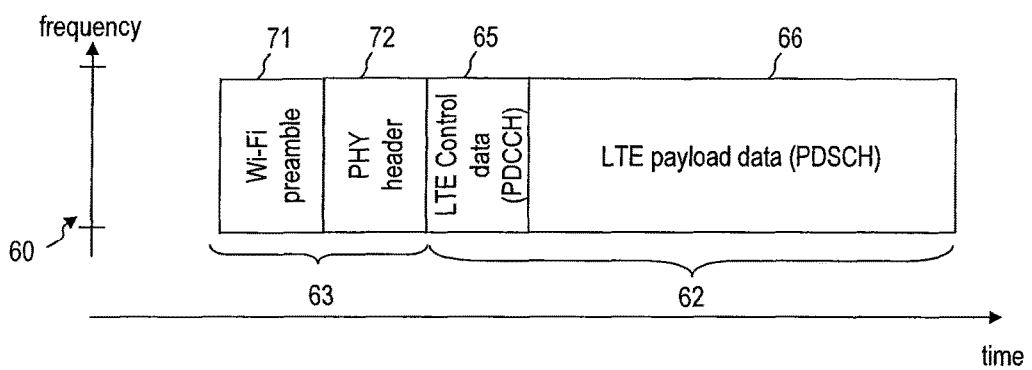
FIG. 9 is a view illustrating a transmission of a plurality of bits inserted before a LTE-U data transmission by a communication device according to an embodiment.

FIG. 9 is a view illustrating operation of a communication device according to an embodiment when a radio resource 60, e.g. a LTE-U carrier in a LTE-U frequency band, is to be used for the LTE-U data transmission 62.

The plurality of bits 63 includes a WLAN preamble, e.g. a Wi-Fi preamble 71 and a PHY header 72. The plurality of bits 63 may consist of the Wi-Fi preamble 71 and the PHY header 72. The Wi-Fi preamble, and the PHY header may be configured in accordance with the IEEE 802.11 standard family.

The PHY header 72 has a length field. The communication device may set the bits of the length field such that they indicate a time associated with the LTE-U data transmission 62. The communication device may set the bits of the length field of the PHY header such that they indicate a duration of the LTE-U data transmission. The communication device may set the bits of the length field of the PHY header such that they indicate a time until a start of the LTE-U data transmission.

Additional information may be included in the plurality of bits 63. For illustration, information which allows a user equipment to estimate channel properties of a LTE-U channel may be included in the plurality of bits.

Figure 10:
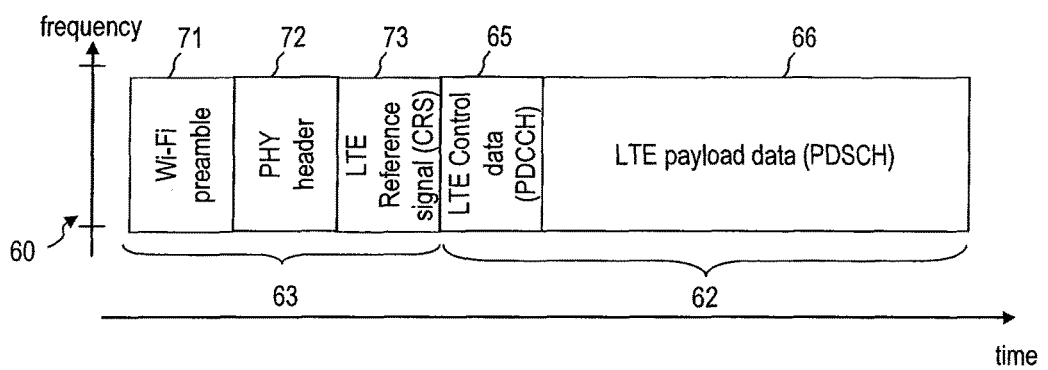
FIG. 10 is a view illustrating a transmission of a plurality of bits inserted before a LTE-U data transmission by a communication device according to an embodiment.

FIG. 10 is a view illustrating operation of a communication device according to an embodiment when a radio resource 60, e.g. a LTE-U carrier in a LTE-U frequency band, is to be used for the LTE-U data transmission 62.

The plurality of bits 63 includes a WLAN preamble, e.g. a Wi-Fi preamble 71, a PHY header 72, and an LTE reference signal 73. The reference signal 73 may be a cell specific reference signal (CRS). The plurality of bits 63 may consist of the WLAN preamble, e.g. the Wi-Fi preamble 71, the PHY header 72 and the LTE reference signal 73. The Wi-Fi preamble and the PHY header may be configured in accordance with the IEEE 802.11 standard family.

Figure 11:
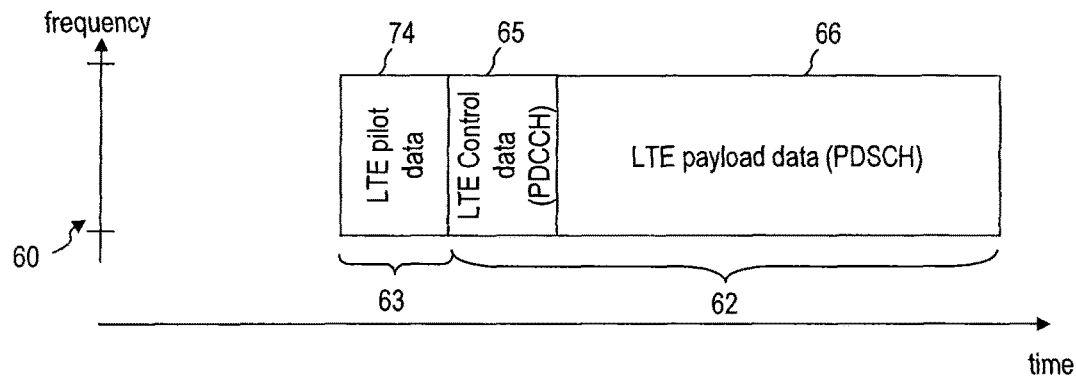
FIG. 11 is a view illustrating a transmission of a plurality of bits inserted before a LTE-U data transmission by a communication device according to an embodiment.

FIG. 11 is a view illustrating operation of a communication device according to an embodiment when a radio resource 60, e.g. a LTE-U carrier in a LTE-U frequency band, is to be used for the LTE-U data transmission 62.

The plurality of bits 63 includes LTE pilot data 74. The plurality of bits 63 may consist of the LTE pilot data 74. The LTE pilot data 74 may be used by a further communication device, e.g. a user equipment, for demodulating the subsequently transmitted LTE-U data transmission 62. The LTE pilot data 74 may be used by the user equipment to estimate channel properties, for example.

Figure 12:
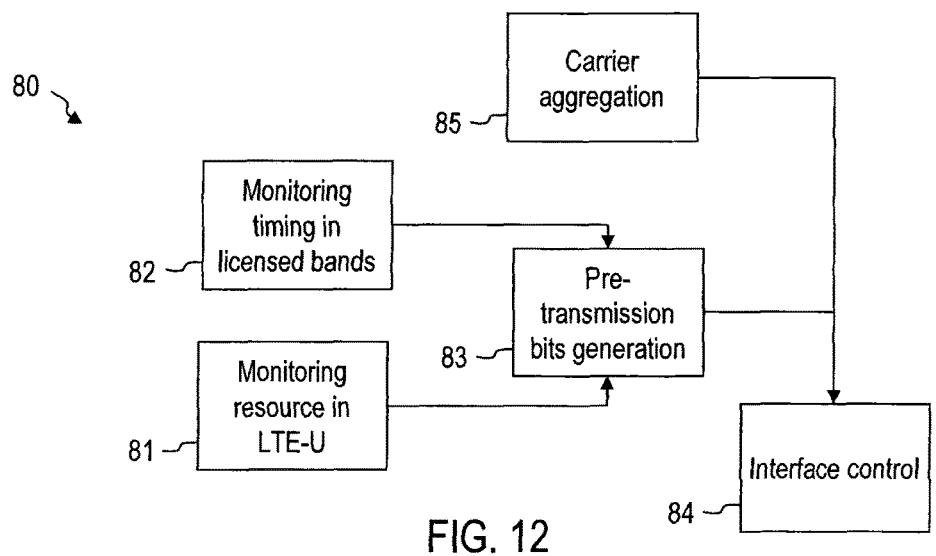
FIG. 12 is block diagram of a communication device according to an embodiment.

FIG. 12 is a functional block diagram 80 of a communication device according to an embodiment. The communication device may be an eNodeB. The various processing functions explained with reference to FIG. 12 may be implemented in a base station logic.

The communication device may comprise a resource usage monitoring module 81 which monitors a resource usage of LTE-U radio resources. The resource usage monitoring module 81 may determine a radio signal energy in each one of a plurality of LTE-U carriers.

The communication device may comprise a timing monitoring module 82 which monitors a timing of a cellular network. The timing monitoring module 82 may determine a time gap remaining until a start of a next subframe when a radio resource of the LTE-U frequency band becomes free for usage of the communication device.

The communication device may comprise a pre-transmission bits generation module 83. The pre-transmission bits generation module 83 generates a plurality of bits for inclusion as a header to a LTE-U data transmission. The pre-transmission bits generation module 83 may generate a number of bits for transmission at the radio resource which may depend on the time gap to the start of the next subframe, as determined by the timing monitoring module 82. The pre-transmission bits generation module 83 may generate the bits to have the same value or to be a random sequence. The pre-transmission bits generation module 83 may generate the plurality of bits such that they carry information. The information may comprise a WLAN preamble, e.g. a Wi-Fi preamble. The information may comprise a PHY header. The information may comprise a time information related to the LTE-U data transmission which is included in the PHY header. The information may comprise LTE pilot data.

The communication device may comprise an interface control module 84. The interface control module 84 may be configured to control a transmitter such that the plurality of bits is output before the LTE-U data transmission. The interface control module 84 may be configured to control the transmitter such that the plurality of bits which forms a header for the LTE-U data transmission and the LTE-U data transmission are transmitted as a radio signal on a carrier which is a LTE-U carrier.

The communication device may comprise additional functional entities. For illustration, when LTE-U carriers are integrated as secondary carriers with LTE licensed carriers, the communication device may comprise a carrier aggregation module 85. The carrier aggregation module 85 may perform control signalling for data traffic offloaded to the secondary LTE-U carriers.

Various effects are attained by the devices, methods and systems according to embodiments. For illustration, the communication device may mitigate the risk that a further communication device starts using a LTE-U radio resource just before the communication device starts a LTE-U data transmission.

While exemplary embodiments have been described with reference to the drawings, modifications may be implemented in other embodiments. For illustration, the communication device does not need to be an eNodeB. The communication device may be a user equipment which performs LTE-U data transmissions in the uplink. The user equipment may mitigate the risk that a further communication device starts using a LTE-U radio resource just before the communication device starts a LTE-U data transmission using the techniques described herein.

For further illustration, the communication device may not only be used when LTE-U carriers are aggregated with LTE licensed carriers, but may also be used for standalone LTE-U systems.

Although the invention has been shown and described with respect to certain preferred embodiments, equivalents and modifications will occur to others skilled in the art upon the reading and understanding of the specification. The present invention includes all such equivalents and modifications, and is limited only by the scope of the following claims.

What is claimed is:

1. A method, comprising:
   determining, by a communication device, a time gap relative to a start time of a subframe of a communication network, wherein the time gap comprises a time delay associated with gaining access to the subframe;
   transmitting, by the communication device, a plurality of bits based on the time gap in an unlicensed frequency band which are inserted before an unlicensed data transmission to thereby prevent, by the communication device, at least one further communication device from using radio resources until the unlicensed data transmission starts,
   wherein the plurality of bits have random values that output energy at the radio resources that prevents the at least one further communication device from using the radio resources.

2. The method of claim 1, further comprising:
   generating the plurality of bits by the communication device in response to detecting that the communication device intends to perform the unlicensed data transmission.

3. The method of claim 1, further comprising:
   setting a number of bits of the plurality of bits in dependence on the time gap.

4. The method of claim 3, further comprising:
   synchronizing the unlicensed data transmission with the start time of the subframe.

5. The method of claim 1, further comprising:
   monitoring, by the communication device, whether the at least one further communication device uses the radio resources in the unlicensed frequency band,
   wherein the communication device starts transmitting the plurality of bits while the radio resources are not used by the at least one further communication device.

6. The method of claim 1, further comprising:
   dynamically adjusting a number of bits of the plurality of bits that are transmitted based on a time remaining to a start time of a next subframe of a communication network.

7. The method of claim 1, further comprising:
continuously transmitting the plurality of bits in the unlicensed frequency band until a start time of a next subframe of a communication network.

8. The method of claim 1,
wherein the plurality of bits prevents at least one further communication device from using the radio resources until the unlicensed data transmission starts.

9. The method of claim 1, further comprising:
monitoring a timing of a communication network,
determining a time gap remaining until a start time of a next subframe of a communication network based on said monitoring.

10. The method of claim 1,
wherein the plurality of bits is a header of the unlicensed data transmission.

11. The method of claim 1, further comprising:
receiving, by a further communication device, the plurality of bits, and
using, by the further communication device, the plurality of bits for demodulating the unlicensed data transmission.

12. The method of claim 11,
wherein the further communication device estimates channel properties of the unlicensed data transmission using the plurality of bits.

13. The method of claim 1,
wherein the plurality of bits comprises a resource allocation for the unlicensed data transmission.

14. The method of claim 1,
wherein the plurality of bits comprises a WLAN preamble.

15. The method of claim 1,
wherein the plurality of bits comprises a WLAN preamble and a PHY header.

16. The method of claim 1,
wherein the plurality of bits comprises pilot data of a communication network.

17. The method of claim 1,
wherein the data transmission comprises control data transmitted in the unlicensed band.

18. A communication device, comprising:
a transmitter configured to transmit unlicensed radio signals in an unlicensed frequency band, and
a processing device configured to determine a time gap comprising a time delay associated with gaining access to a start time for a subframe and control the transmitter to prevent at least one further communication device from using radio resources until an unlicensed data transmission starts by transmitting a plurality of bits based on the time gap in the unlicensed frequency band which are inserted before the unlicensed data transmission,
wherein the plurality of bits have random values that output energy at the radio resources that prevents the at least one further communication device from using the radio resources.

19. A communication system, comprising:
a communication device, the communication device comprising:
a transmitter configured to transmit unlicensed, unlicensed, radio signals in an unlicensed frequency band, and
a processing device configured to determine a time gap comprising a time delay associated with gaining access to a start time for a subframe and control the transmitter to secure radio resources in the unlicensed frequency band for an unlicensed data transmission and to prevent a further communication device from using the radio resources until the unlicensed data transmission starts by transmitting a plurality of bits based on the time gap in the unlicensed frequency band which are inserted before the unlicensed data transmission; and
the further communication device configured to receive the plurality of bits,
wherein the plurality of bits transmitted by the communication device have random values that output energy at the radio resources that prevents the further communication device from using the radio resources.

* * * * *

UNITED STATES PATENT AND TRADEMARK OFFICE
CERTIFICATE OF CORRECTION

PATENT NO. : 10,123,213 B2
APPLICATION NO. : 15/600120
DATED : November 6, 2018
INVENTOR(S) : Agardh et al.

Page 1 of 1

It is certified that error appears in the above-identified patent and that said Letters Patent is hereby corrected as shown below:

On the Title Page

Item (*) Notice: Please insert:
-- This patent is subject to a terminal disclaimer. --

Signed and Sealed this
Nineteenth Day of March, 2019

Andrei Iancu
*Director of the United States Patent and Trademark Office*